United States Patent [19]

Oldenburg

[11] 4,153,086
[45] May 8, 1979

[54] AUGER-TYPE TREE CUTTER

[75] Inventor: Dorrance Oldenburg, Yorkville, Ill.

[73] Assignee: Caterpillar Tractor Co., Peoria, Ill.

[21] Appl. No.: 699,758

[22] Filed: Jun. 25, 1976

[51] Int. Cl.² ............................................ A01G 23/08
[52] U.S. Cl. ..................... 144/34 R; 83/928; 144/3 D
[58] Field of Search ............ 144/3 D, 34 R, 309 AC; 83/613, 698, 638, 928

[56] References Cited

U.S. PATENT DOCUMENTS

| 337,018 | 3/1886 | Rendall | 144/34 R |
|---|---|---|---|
| 2,955,631 | 10/1960 | Hoadley | 144/34 E |
| 3,688,816 | 9/1972 | Runeson | 144/34 R |
| 3,848,648 | 11/1974 | Dika et al. | 144/34 R |
| 3,902,538 | 9/1975 | Muirhead | 144/34 R |
| 4,013,106 | 3/1977 | Albright | 144/34 R |
| 4,057,087 | 11/1977 | Oldenburg | 144/309 AC |

FOREIGN PATENT DOCUMENTS 550365  3/1923  France ..................... 144/34 R

*Primary Examiner*—Othell M. Simpson
*Assistant Examiner*—W. D. Bray
*Attorney, Agent, or Firm*—Phillips, Moore, Weissenberger, Lempio & Majestic

[57] ABSTRACT

A tree cutter mechanism adapted for mounting on a suitable vehicle includes a frame defining a U-shaped opening for embracing a standing tree, a rotating auger cutter slidably mounted on the frame for selective linear movement across the U-shaped opening to sever trees disposed therein, and a tree drive mechanism mounted on said frame for holding a standing tree for cutting by the auger cutter. A ribbed plate is provided behind the rotatable auger for sliding movement in concert therewith to prevent binding of the auger as it moves through the tree.

9 Claims, 5 Drawing Figures

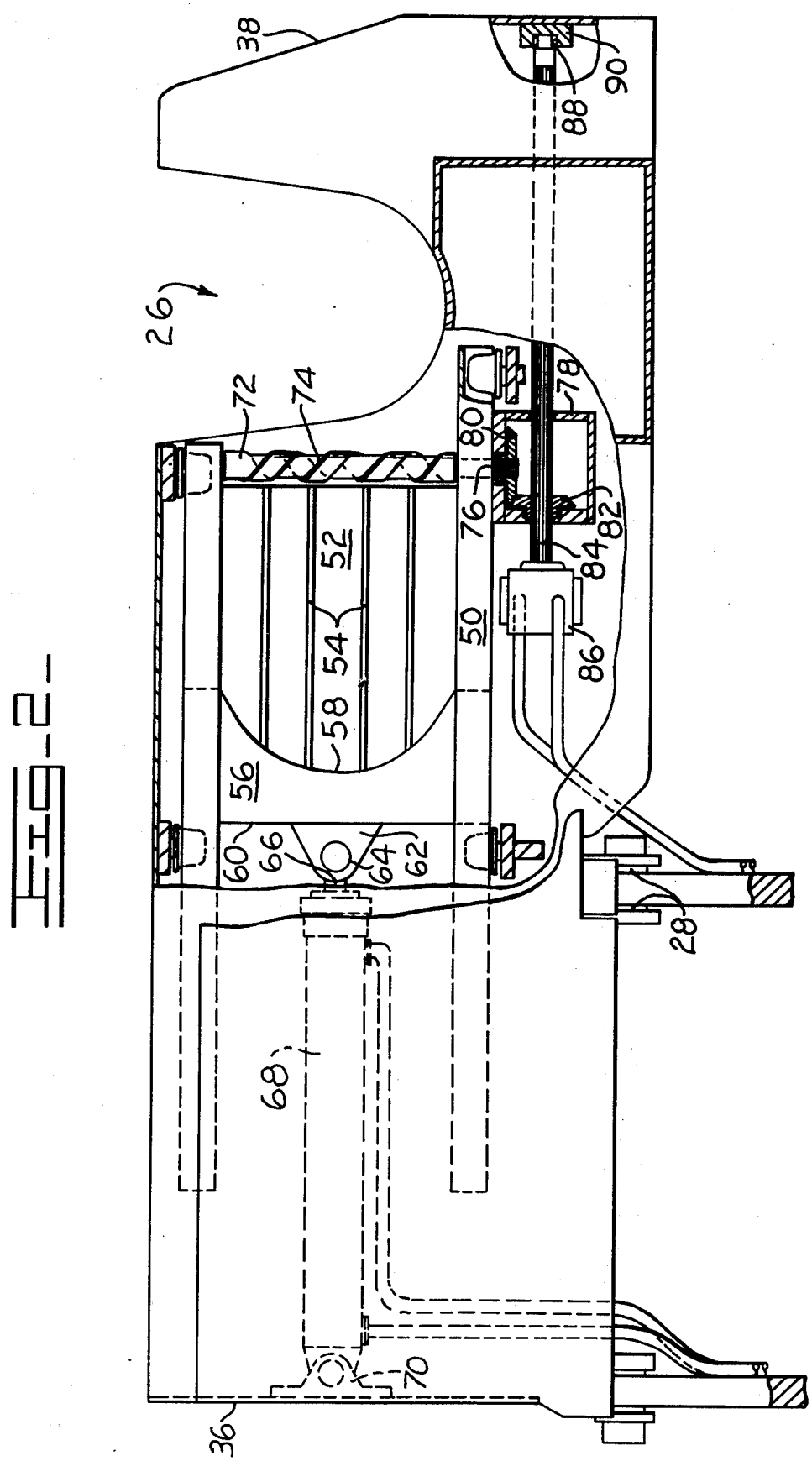

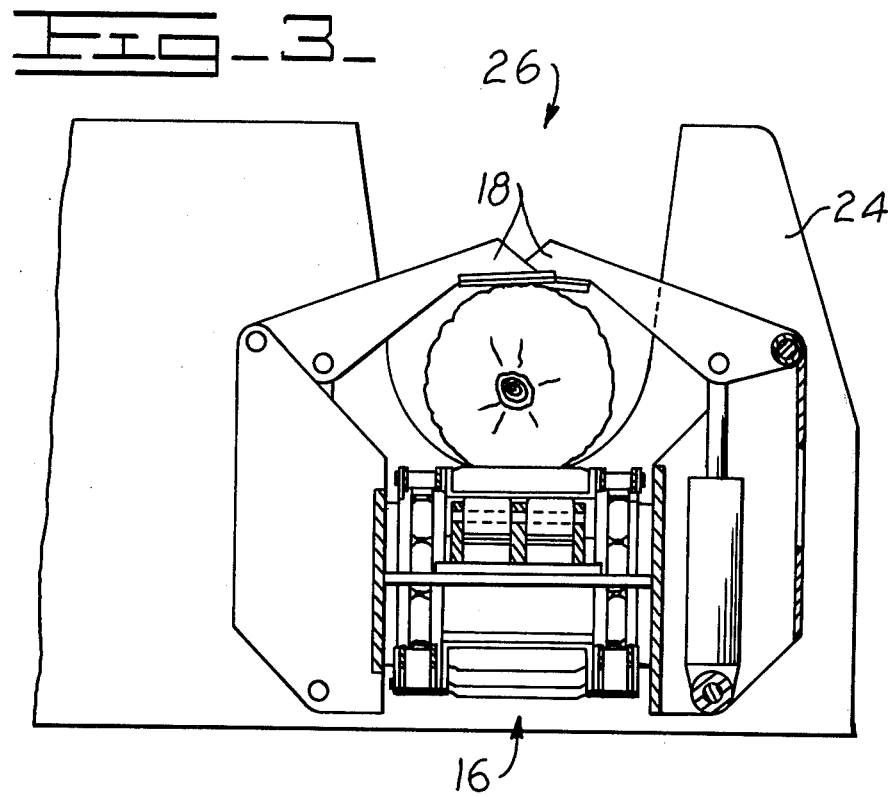
Fig-3-
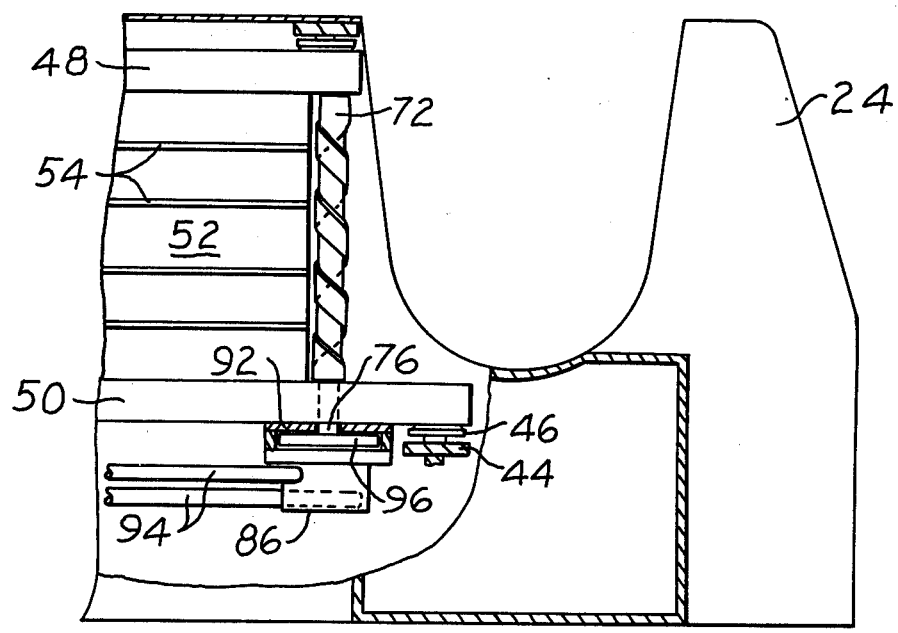
Fig-4-

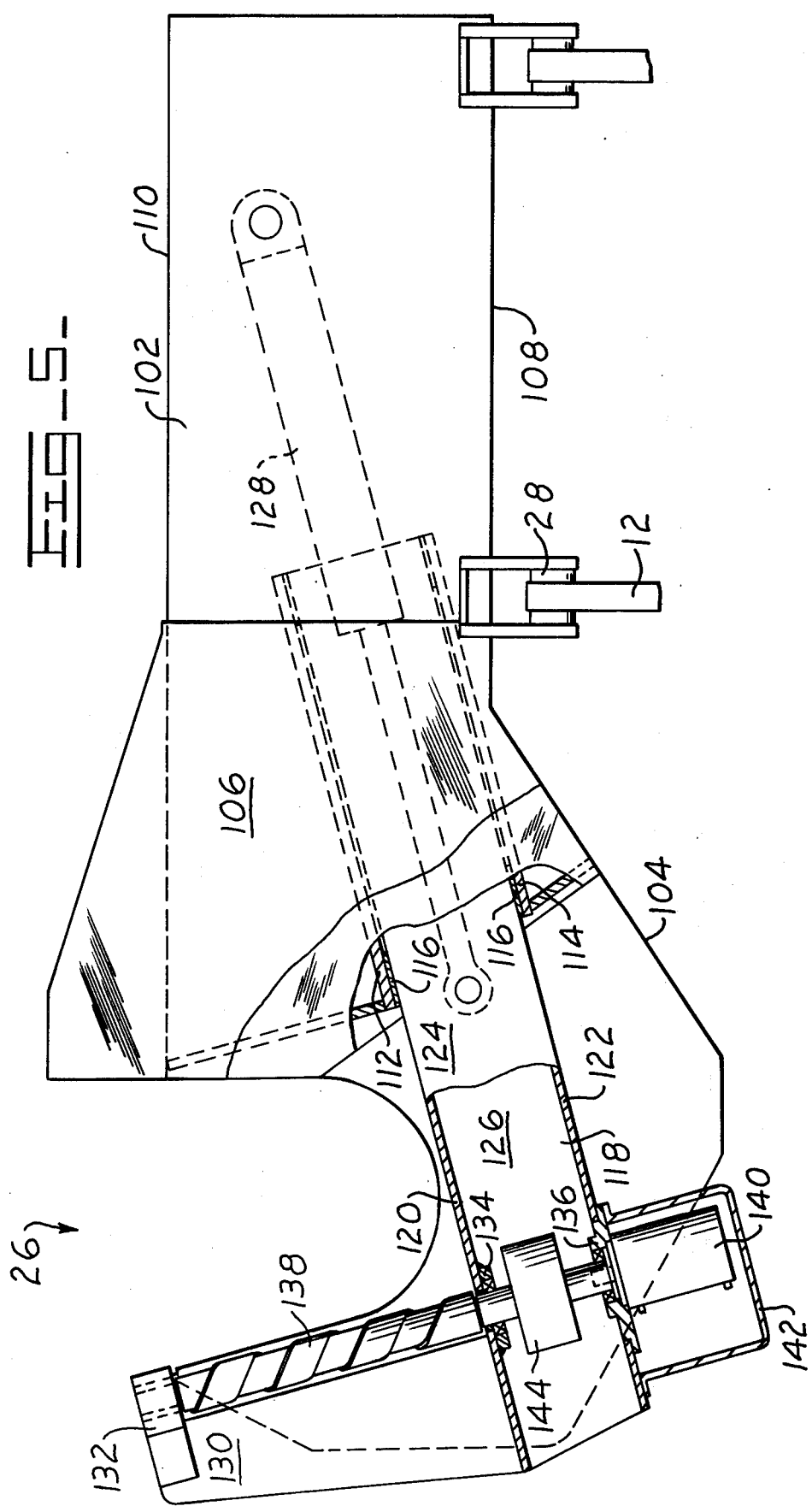

AUGER-TYPE TREE CUTTER

BACKGROUND OF THE INVENTION

This invention relates to the field of apparatus for felling standing trees, and more particularly, to an improved cutting assembly for use in such apparatus.

The use of auger-type cutters for felling trees is well-known in the art. U.S. Pat. Nos. 337,018; 1,263,385; 1,451,079; 3,457,977; 3,902,538 and French Pat. Nos. 550,365 and 525,812 show the use of such devices generally. However, such auger-type tree cutters have enjoyed only limited acceptance by the industry. One problem encountered is binding of the auger cutter by the tree as the auger passes through the tree.

SUMMARY OF THE INVENTION

Accordingly, it is an object of the present invention to provide an auger-type tree cutting device which prevents binding of the auger as it moves through the tree. This objective is achieved by providing a plate member which moves through the tree with the auger, and which includes wedge means for supporting the tree behind the auger. The auger and plate are slidably mounted on a frame having a U-shaped opening adapted to embrace a tree for movement across said opening. A tree drive mechanism is provided on the frame above the auger for holding trees during cutting.

BRIEF DESCRIPTION OF THE DRAWINGS

In the drawings:

FIG. 2 is a plan view of the cutting device of the present invention;

FIG. 3 is a sectional view of the tree harvester apparatus shown in FIG. 1 taken along the line 3—3 in FIG. 1;

FIG. 4 is a plan view of an alternate embodiment of the tree cutter of the present invention; and FIG. 5 is a plan view of still another embodiment of the tree cutter of the present invention.

DESCRIPTION OF THE PREFERRED EMBODIMENT

Figure 1:
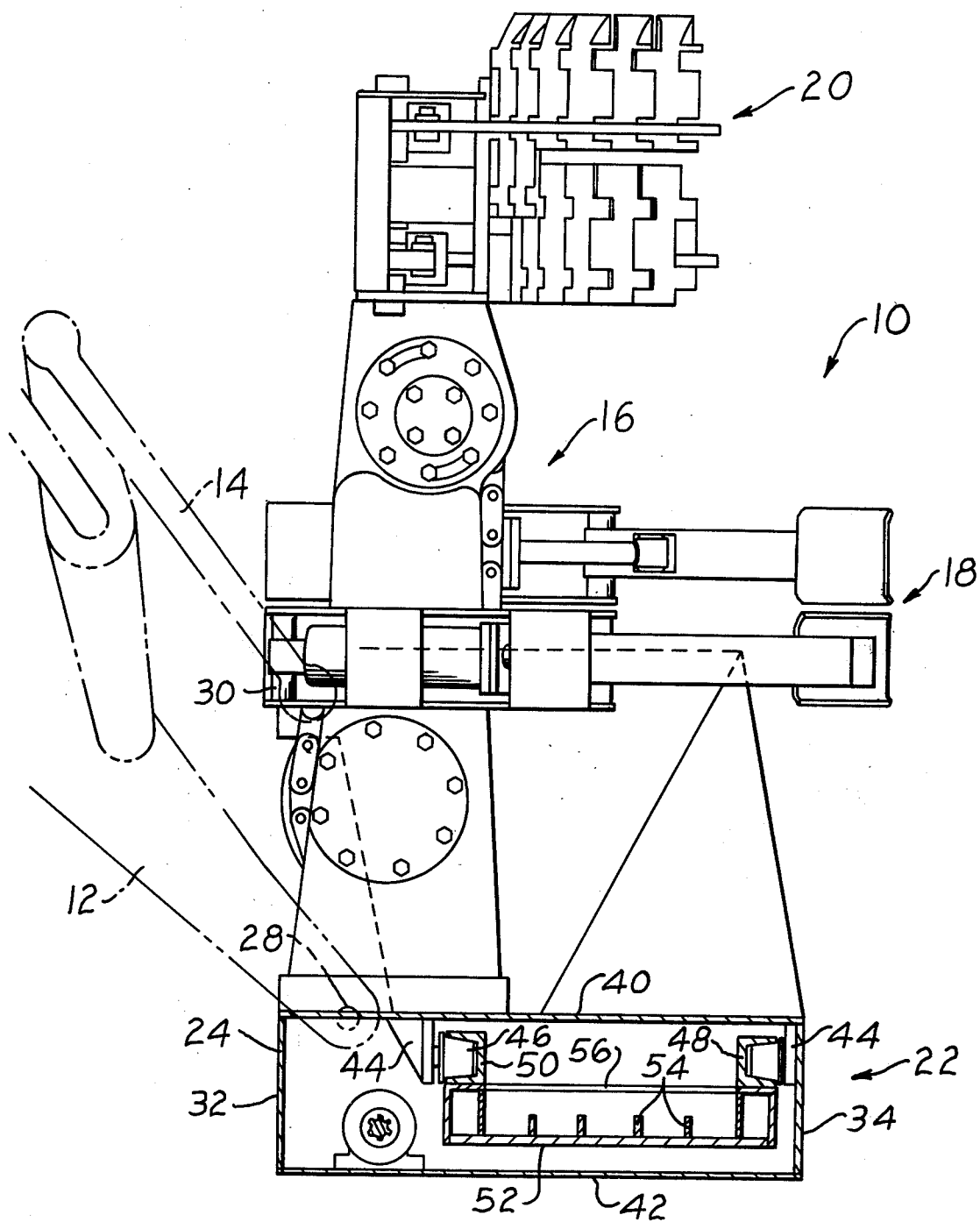
FIG. 1 is a side elevation of a tree harvesting machine embodying the present invention.

Referring to FIG. 1, a tree cutter mechanism commonly known as a tree harvester is shown generally at 10 adapted for rotatable mounting upon a vehicle such as upon vehicle lift arms 12 and tilt arms 14 shown in phantom. The tree harvester apparatus includes a drive mechanism 16 which includes a pair of grapples 18 for securing standing trees during cutting and then rotating them to a horizontal position and driving them through a delimbing assembly such as the one shown at 20. An example of such a drive mechanism is shown in U.S. Pat. No. 3,669,161. The tree harvester also includes a cutting mechanism 22 for severing standing trees secured in the grapples as shown in FIG. 3. However, the cutting mechanism of the present invention may be employed either alone or with the drive mechanism 16 and the rest of the tree harvester attachment shown in FIG. 1.

Referring now to FIG. 2, cutting mechanism 22 includes a frame 24 which has a U-shaped opening 26 provided therein toward one end of the frame which is adapted for embracing standing trees for cutting. The frame includes journals 28 for pivotally mounting the frame to the ends of vehicle lift arms 12. If the cutting mechanism is employed with the tree harvester assembly shown in FIG. 1, tilt arms 14 are mounted to pivots 30 provided on drive mechanism 16. If it is desired to employ cutting mechanism 22 alone without the rest of the tree harvester assembly, an upstanding frame attached to frame 24 and having pivots provided in the distal end thereof for attachment to the ends of tilt arms 14 may be provided.

Frame 24 is of a generally rectangular box-like configuration and includes sidewalls 32 and 34, end walls 36 and 38, and top and bottom plates 40 and 42 respectively having cut outs which define U-shaped opening 26 provided therein. Depending from top plate 40 inwardly of the frame are four brackets 44 having rollers 46 rotatably mounted thereon on horizontal axes inwardly of the sidewalls of frame 24. Slidably mounted on rollers 46 are spaced parallel channel members 48 and 50 joined together by a plate 52 having upstanding ribs 54 provided thereon. The channel members are also joined together by a plate 56 spaced above the rear portion of plate 52 in parallel relationship therewith and having an arcuate leading edge 58. The rear edges of plates 52 and 56 are joined by an end plate 60 having a bracket 62 mounted thereon which includes a journal 64 for pivotal connection with the distal end of the rod 66 of a hydraulic cylinder 68 having its cylinder end pivotally mounted to a bracket 70 mounted on end wall 36. Hydraulic cylinder 68 is communicated to the vehicle hydraulic system and suitable control valves through conduits which are not shown.

Transversely mounted in journals on channel members 48 and 50 at the lead end of plate 56 is an auger 72 having a cutting edge 74 provided thereon facing outer channel member 48 so that the auger will be thrust toward member 50 during operation where a suitable thrust bearing is provided. A splined stub shaft 76 extends from the auger through channel member 50 into a gearbox 78 mounted on channel member 50 for movement therewith. Mounted on the end of stub shaft 76 is a first bevel gear 80 engaged by a second bevel gear 82 carried by gearbox 78 and slidably mounted on a splined shaft 84 which extends through gearbox 78 from a hydraulic motor 86 mounted on bottom plate 42, to a journal bearing 88 in a block 90 mounted on end wall 38. Motor 86 is communicated with a hydraulic pump in the vehicle hydraulic system through conduit and control valve means which are not shown.

In operation, hydraulic cylinder 68 may be selectively operated to push rotating auger 72 and plate 52 through a standing tree disposed within U-shaped opening 26 as shown in FIG. 3. Motor 86 drives auger 72 through the bevel gears which slide along splined shaft 84 as the auger and plate move through the tree.

As plate 52 follows auger 72 through the cut portion of a tree, ribs 54 serve as wedge means to support the cut portion of the tree behind the auger to prevent the weight of the tree from pinching the auger. For optimum performance the top of ribs 54 should project up to a level that is slightly below the top of the auger.

In an alternative embodiment, shown in FIG. 4, motor 86 is mounted on channel member 50 by means of a bracket 92 for movement therewith and in direct driving relationship with shaft 76, avoiding the need for gear box 78 and splined shaft 84. Flexible conduits 94 maintain communication of motor 86 with the vehicle hydraulic system as the motor moves with channel member 50. A flywheel 96 is provided on shaft 76 to smooth rotation of the auger. A flywheel is considered desirable and can also be employed on shaft 76 in the first described embodiment adjacent bevel gear 80.

Another embodiment of the tree cutter of the present invention is shown in FIG. 5. An elongated, box-like frame 102 has a U-shaped opening 26 provided toward one end thereof for embracing standing trees, and has journals 28 provided near the other end thereof for mounting the frame to the ends of vehicle lift arms 12 as previously described with respect to the embodiment shown in FIG. 2. Frame 102 includes a lower plate 104 which has U-shaped opening 26 provided therein, and an upper plate 106 spaced above lower plate 104 in parallel relationship therewith by sidewalls 108 and 110. Plate 106 extends to, but does not include, U-shaped opening 26.

Also disposed between lower plate 104 and upper plate 106 are parallel guide members 112 and 114 arranged to define, together with those portions of the lower and upper frame plates extending therebetween, a rectangular guideway provided with bearings 116 for supporting a carriage member 118 in slidable, telescopic relationship therein.

Carriage 118 comprises spaced parallel elongated sidewall members 120 and 122 joined by similarly spaced parallel top and bottom wall members 124 and 126, providing the carriage with a rectangular cross-section. Carriage 118 is disposed within the guideway defined by guide members 112 and 114 which are so arranged on lower plate 104 that the distal end of carriage 118 extends past and just below the bottom of U-shaped opening 26, as defined by lower plate 104. The upper plate 106 of frame 102 extends only up to the U-shaped opening 26 so that the distal end of carriage 118 projecting from the guideway defined by members 112 and 114 projects from between upper plate 106 and lower plate 104 and overlies that portion of lower plate 104 which defines U-shaped opening 26.

A hydraulic jack 128 is also disposed within frame 102 and has one end secured thereto. The jack extends into and parallel with the guideway defined by members 112 and 114 and has its rod end secured to carriage 118. Jack 128 is connected by suitable hydraulic conduits not shown to a hydraulic control system for selectively extending and retracting carriage 118 within the guideway defined by members 112 and 114.

Mounted on one side of the distal end of carriage 118 as by welding is a heavy plate 130 which is arranged to project from the carriage along one side of U-shaped opening 26. Plate 130 has a bearing block 132 projecting from the distal end thereof. Journaled in bearing block 132 and in journal bearings 134 and 136 provided in carriage 118 is an auger type cutter 138 disposed parallel with an immediately adjacent one enge of plate 130, and adjacent U-shaped opening 26 when carriage 118 is extended from the guideway provided in frame 102. Also mounted on carriage 118 in direct driving engagement with the auger-type cutter 138 is a hydraulic motor 140 disposed within a housing 142. A flywheel 144 is mounted on the auger shaft within carriage 118 for smooth operation of the auger cutter.

In operation, the tree cutter of the present embodiment is positioned so that a standing tree is disposed within U-shaped opening 26 with carriage 118 extended so that auger cutter 138 is disposed outside of opening 26 and the tree disposed therein. Hydraulic jack 128 is then actuated to retract carriage 118 within the guideway in frame 102 whereby the auger cutter will be pulled across U-shaped opening 26 and through the tree disposed therein. As the cutter 138 moves through the tree it is followed closely by plate 130 which not only supports the distal end of the cutter but also serves as wedge and support means for supporting the severed portion of the tree to prevent the weight thereof from binding and pinching the auger cutter 138.

I claim:

1. An auger-type tree cutter assembly comprising:
   a frame adapted for mounting on a vehicle for movement into close association with standing trees; comprising an elongated generally rectangular box-like configuration having a U-shaped opening provided in one side thereof and including spaced upper and lower plates defining said U-shaped opening, spaced parallel guide members disposed between said plates normal thereto, to define a carriage guideway together with said upper and lower plates,
   an elongated carriage member, a portion of which is slidably and telescopically disposed within said carriage guideway whereby the carriage will extend beyond the U-shaped opening along a side thereof,
   a plate mounted on the distal end of the carriage and extending outward from one side thereof whereby it will pan across the U-shaped opening as the carriage is extended or retracted in the guideway,
   bearing means provided at one edge of the plate at the outer end thereof,
   an auger mounted on the distal end of the carriage and on the bearing means, and extending along an edge of the plate,
   motor means for driving the auger,
   hydraulic control means for selectively sliding the carriage in the guideway whereby the auger will pan transversely across the U-shaped opening for cutting trees disposed therein,
   and a drive mechanism disposed on the frame above the auger, and including grapple means for securing standing trees for cutting by the auger.

2. The assembly defined in claim 1 wherein said carriage comprises an elongated box-like structure of rectangular cross-section.

3. The tree cutter assembly defined in claim 1 further comprising axially aligned bearing means provided in the distal end of the carriage, a drive shaft mounted in said journal bearing means and extending therebetween, and wherein said motor means is mounted on the carriage outboard of one of said journal bearing means and is arranged to drive said drive shaft, and the auger is connected to the other end of the drive shaft in driven relationship therewith.

4. The assembly defined in claim 1 further comprising flywheel means mounted on said drive shaft intermediate said journal bearing means.

5. An auger-type tree cutter assembly comprising:
   a frame adapted for mounting on a vehicle for movement into close association with standing trees;
   an auger;
   mounting means slidably mounting said auger on said frame for linear movement with respect thereto through a standing tree disposed proximate said frame;
   plate means mounted on said mounting means immediately adjacent said auger for movement with said auger;
   motor means for rotating the auger;

actuation means for actuating the mounting means to move the auger and plate means mounted thereon with respect to the frame and through a standing tree disposed proximate the frame, and wedge means provided on said plate means for supporting a standing tree behind the auger to prevent the weight of the tree from pinching the auger, said wedge means comprising rib means provided on said plate means parallel to the sliding movement of said plate means.

6. The tree cutter assembly defined in claim 5 wherein said rib means extend upwardly to a plane which is slightly below the top of the auger.

7. An auger-type tree cutter assembly comprising:

a frame having an elongated generally rectangular box-like configuration having a U-shaped opening provided in one side thereof, and adapted for mounting on a vehicle for movement into close association with standing trees;

rollers disposed on the frame;

spaced parallel channel members slidably mounted on the rollers;

plate means on said channel members;

an auger mounted on said channel members adjacent the plate means;

motor means for rotating the auger;

actuation means for actuating the mounting means to move the auger and plate means mounted thereon with respect to the frame wherein said channel members and auger are disposed within said frame for selective movement of the auger across the U-shaped opening, and a driven shaft carried by one of the channel members and connected to the auger for driving the auger, and a gear box carried by one of said channel members, a splined drive shaft driven by said motor means, extending through said gear box and rotatably mounted on the frame, a first bevel gear attached to the driven shaft, a second bevel gear rotatably mounted on the gear box in driving engagement with said first bevel gear and slidably carried on the splined drive shaft, whereby the auger will be driven by the splined drive shaft as it is advanced across the U-shaped opening in the frame.

8. An auger-type tree cutter assembly comprising:

a frame having a U-shaped opening provided in one side thereof, and adapted for mounting on a vehicle for movement into close association with standing trees;

rollers disposed on the frame;

spaced parallel channel members slidably mounted on the rollers;

plate means on said channel members;

an auger mounted on said channel members adjacent the plate means;

motor means for rotating the auger;

actuation means for actuating the mounting means to move the auger and plate means mounted thereon with respect to the frame wherein said channel members and auger are disposed within said frame for selective movement of the auger across the U-shaped opening, and a driven shaft connected to the auger for driving thereof and carried by one of said channel members, and wherein said motor means is carried by said one of said channel members and connected to said driven shaft.

9. The tree cutter assembly defined in claim 8 further comprising flywheel means associated with the auger.

* * * * *